United States Patent [19]
Burtelson

[11] 4,272,300
[45] Jun. 9, 1981

[54] METHOD FOR CLEANING GREASE-FILLED CABLE STUB

[75] Inventor: Frederick W. Burtelson, Harvard, Ill.

[73] Assignee: Reliable Electric Company, Franklin Park, Ill.

[21] Appl. No.: 119,095

[22] Filed: Feb. 6, 1980

Related U.S. Application Data

[62] Division of Ser. No. 933,056, Aug. 11, 1978.

[51] Int. Cl.³ .............................................. B08B 7/00
[52] U.S. Cl. ............................................ 134/5; 134/19
[58] Field of Search ........................... 134/5, 18, 19; 174/23 R, 23 C; 432/225, 226, 231, 5, 9; 219/385, 396, 397–399, 405, 411, 354, 386, 387, 412, 413, 414; 99/875, 400, 418, 423, 444–446, 426; 126/343.5 A, 51, 383; 156/155, 49

[56] References Cited

U.S. PATENT DOCUMENTS

| | | | |
|---|---|---|---|
| 1,596,214 | 8/1926 | O'Brien | 219/385 |
| 1,661,354 | 3/1928 | Ayre | 219/385 |
| 1,767,802 | 6/1930 | Langos | 219/385 |
| 2,097,793 | 11/1937 | Howell | 99/446 |
| 3,010,383 | 11/1961 | Greene | 99/375 |
| 3,888,710 | 6/1975 | Burk | 174/23 C |
| 3,962,961 | 6/1976 | Peters | 99/426 |
| 4,002,819 | 1/1977 | Woytiuk | 174/23 C |
| 4,216,369 | 8/1980 | Burtelson | 134/5 |

Primary Examiner—S. Leon Bashore
Assistant Examiner—Michael Goldman
Attorney, Agent, or Firm—Trexler, Wolters, Bushnell & Fosse, Ltd.

[57] ABSTRACT

An unsheathed grease-filled cable stub has the grease removed from around the insulated wires by subjecting the cable stub to radiant heat over the length of the stub and over a major portion of its circumference while the stub is supported on a flexible open mesh of material that overlies a trough. The heated grease melts and flows downwardly for collection into the trough, the grease also flowing through the supporting mesh. The heating temperature of the cable stub is kept low enough to prevent damage to the insulation of the wires.

4 Claims, 6 Drawing Figures

METHOD FOR CLEANING GREASE-FILLED CABLE STUB

This is a division of application Ser. No. 933,056, filed Aug. 11, 1978.

BACKGROUND OF THE INVENTION

This invention relates to a device for cleaning grease-filled electrical cable stubs and also to a novel method for cleaning such cable stubs.

Grease-filled cables are in common use in the telecommunications industry. These cables comprise a number of insulated wires, usually telephone line pairs. The wires are bundled or cabled and are surrounded by a sheath which is grease-packed or grease-filled so that the grease surrounds the insulated conductor wires within the cable. The grease is intended to serve as a moisture barrier for the wires of the cable. Many times, however, it is necessary to cut the cable for purposes of splicing it with another cable. Under such conditions the cable is cut and a length of the cable sheath is removed to form a cable stub at which the insulated wires are exposeed. Thereafter, the grease must be removed, following which insulation is removed from individual wires at end portions thereof preparatory to the splicing operation. The usual method of removing the grease consists of the application of a solvent. This generally involves the use of a clean, lint-free cloth which has been soaked in the cleaning fluid and then applied to the wires of the cable. Such a procedure is time-consuming, messy, and oftentimes ineffective. In addition, the excessive use of cleaning solvents may be hazardous to workers or to the environment. An open flame might also be used to remove the grease from the cable stub but this constitutes a serious fire hazard.

OBJECTS AND SUMMARY OF THE INVENTION

An object of this invention is to provide a device and method for cleaning grease-filled cable stubs which is efficient and less time-consuming than prior art methods.

A further object of this invention is to provide a method of the type and for the purpose stated which can be readily carried out in the field by ordinary telephone repair personnel.

A still further object of this invention is to provide a device for cleaning grease from the cable stub which is portable and easy to use.

In accordance with the foregoing objects the invention comprises a portable device for cleaning grease from around the insulated wires of the cable stub and comprises a frame or support, a trough on the support and having an open top, means for supporting a stub of electrical cable in proximity to the open top such that grease covered insulated wires are exposed to the interior of the trough over substantially the length of the stub, radiant heating means on the support or frame adjacent to the supported cable stub and extending over the length of the stub and over a substantial circumferentially extent of the stub for melting the grease such that the melted grease drains into said trough for collection therein, and means for maintaining the heat at a level that avoids damage to the insulation of the wires.

Preferably the means for supporting the cable stub includes a flexible open mesh of textile material that overlies the top of the trough and upon which the cable stub is adapted to rest. The flexible open mesh material permits drainage of the grease therethrough.

The heating means may include any type of controlled heating arrangement, for example radiant heater elements mounted on the support or frame and extending along the length thereof. A heater control box may include any suitable conventional means for controlling the heat to the heater elements such that the temperature of the heater elements may be thermostatically regulated in a known manner so as to keep the temperature at the stub from becoming too high and thereby damage the insulation of the wires.

In the method of the invention the cable stub is positioned over an open top trough so that the grease is exposed to the inside of the trough, thereafter the stub is heated to a temperature sufficient to melt the grease and allow it to run off of the stub and into the trough to be collected therein, and during such heating the temperature to which the stub is exposed is maintained at a level that avoids damage to the insulation of the wires.

BRIEF DESCRIPTION OF THE FIGURES

FIG. 4 is a fragmentary side elevational view of the trough which forms part of the present invention;

FIG. 5 is a sectional view taken along line 5—5 of FIG. 4;

FIG. 6 is a top plan view of the structure of FIG. 4.

DETAILED DESCRIPTION

Figure 1:
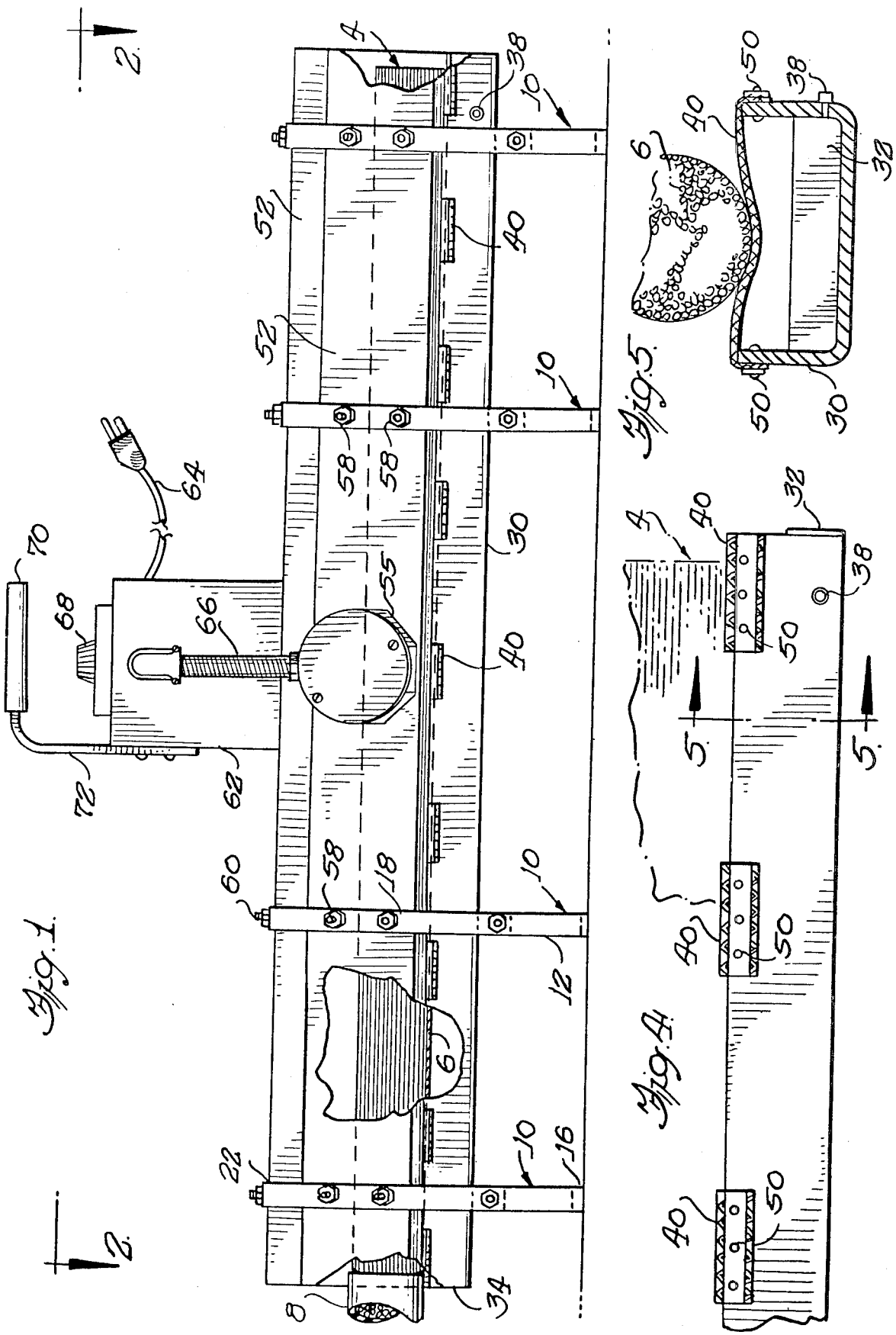
FIG. 1 is a side elevational view, partially broken away, of a device constructed in accordance with and embodying the present invention.
Figure 2:
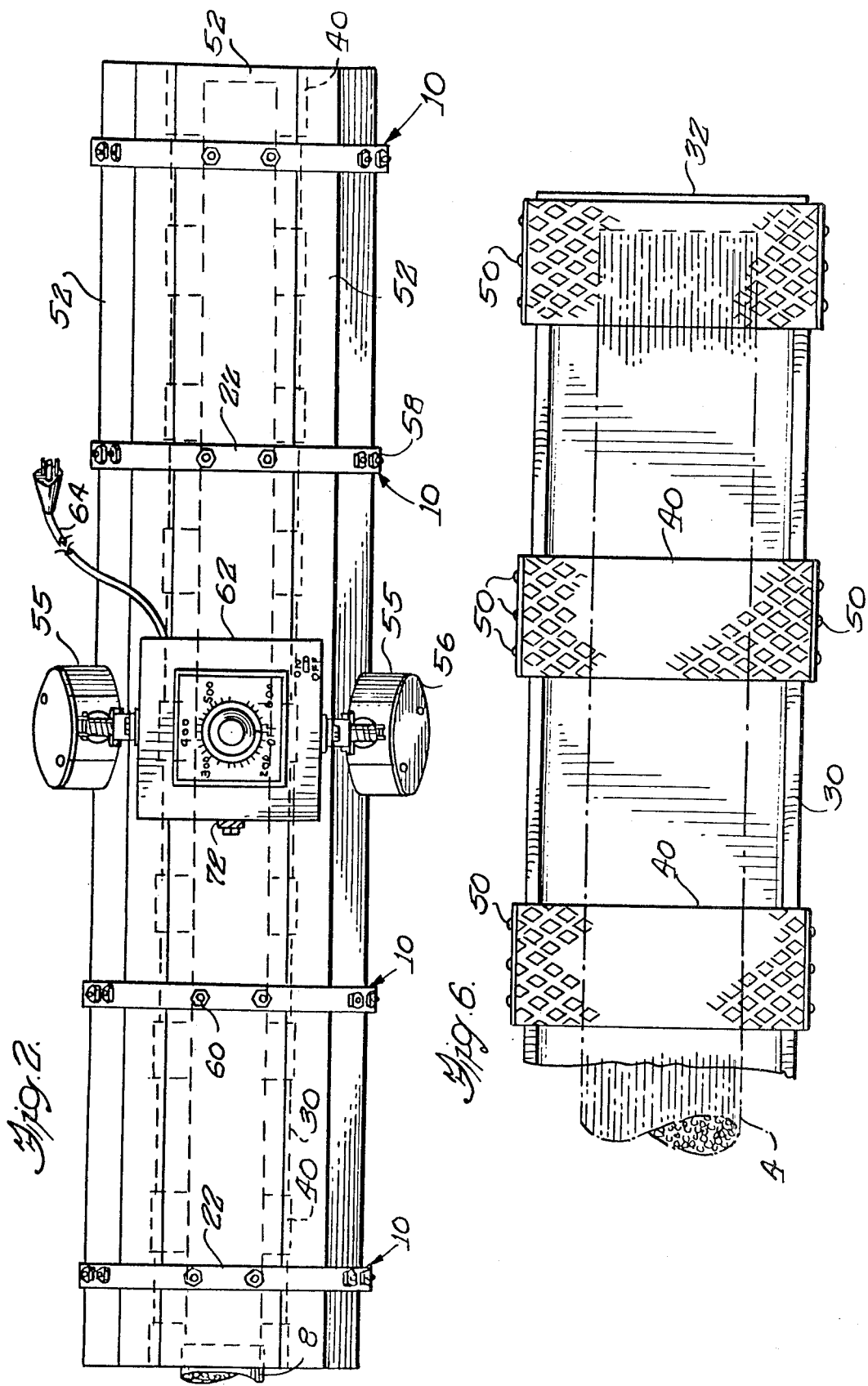
FIG. 2 is a sectional view taken along line 2—2 of FIG. 1.

Referring now in more detail to the drawing there is shown a device 2 for heating a grease-packed cable stub 4 so as to remove the grease therefrom. However, preparatory to heating of the cable stub 4, the cable from which the stub is formed is cut and a section of the cable sheath 8 is removed. The cable comprises a multiplicity of insulated wires 6 which are bundled or cabled together. Packed in and around the insulated wires 6 is a suitable grease, and over the grease-packed wire bundle is the cable sheath 8. It will be seen from FIG. 1 that the cable sheath 8 is removed or cut away from the cable so as to leave the wire bundle of a length that is approximately the same as the length of the device 2.

The device 2 comprises a suitable frame which may be made up of a number of spaced apart, aligned leg structures 10. Each leg structure 10 is of generally U-shaped configuration having opposed leg elements 12,14, the lower ends of the leg elements being formed with inwardly turned feet 16. The upper portion of the leg structure 10 includes opposed sections 18,20 which are at an angle to each other and which merge into a horizontal top section 22. Extending between each pair of leg sections 12,14 in upwardly spaced relationship to the feet 16,16 is a generally horizontal cross member 24. The cross member 24 had downwardly turned flanges 26,26 that abut the leg elements 12, 14. Bolt and nut assemblies 28 may be used to secure the cross members 24 to the leg elements 12,14 through the flanges 26.

Figure 3:
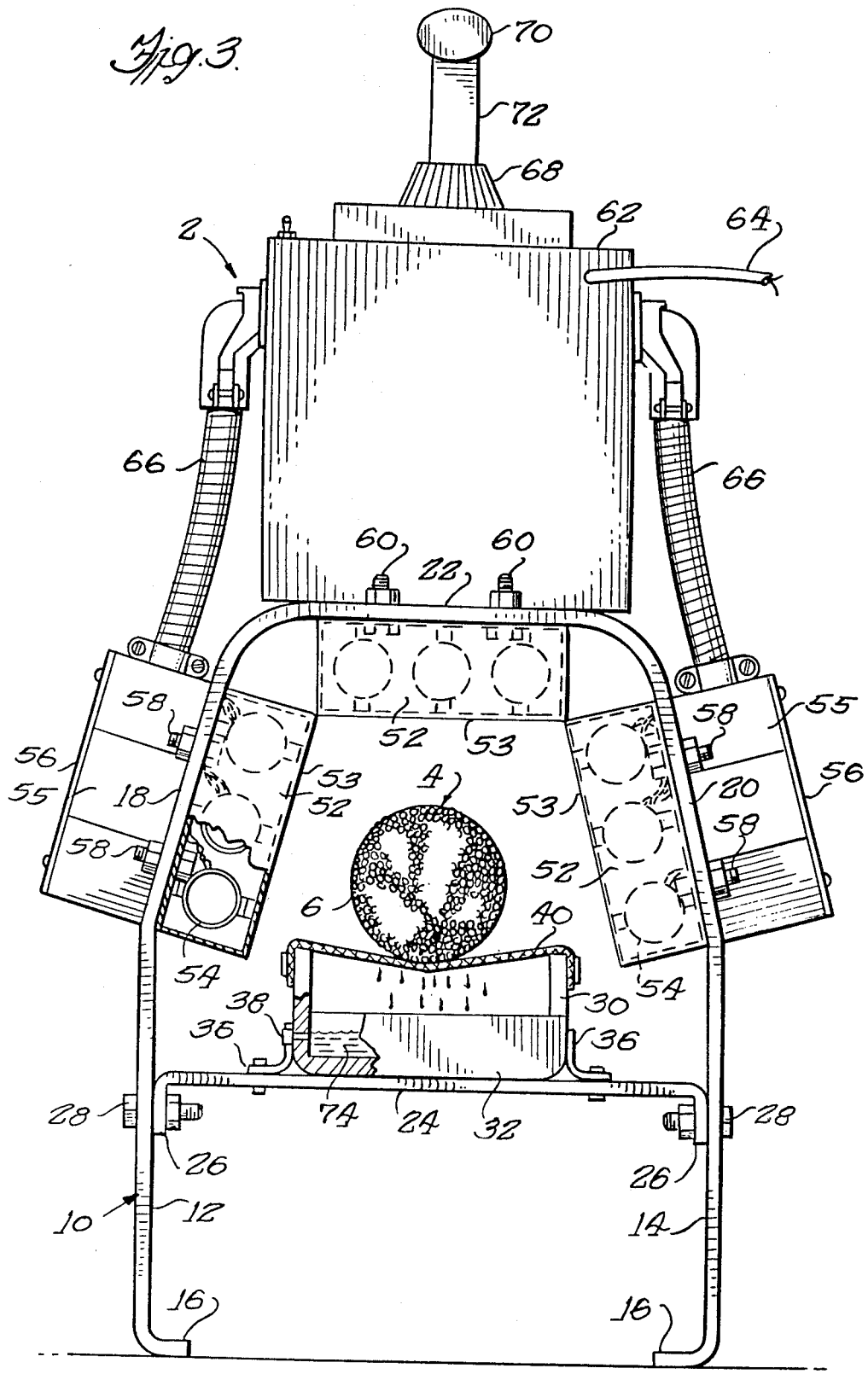
FIG. 3 is an end view on an enlarged scale.

The cross members 24 are in substantial alignment so as to provide a series of supports upon which a trough 30 rests. The trough 30 is relatively shallow so that it is well below and clear of the leg structure sections 18, 20, 22. The trough 30 is U-shaped in cross section, as best seen in FIGS. 3 and 5, and includes opposed end plates 32, 34. These end plates 32, 34 partially close off the opposite longitudinal ends of the trough 30. Bolted or otherwise suitably secured to the end-most cross members 24 are positioning brackets 36, 36 which are spaced apart approximately the width of the trough 30 as to form a friction fit therewith. Consequently, the trough 30 may be readily removed from its normal position on the supporting cross members 24 and readily replaced thereon because the brackets 36, 36 form a friction or spring-like engagement with the sides of the trough 30. Furthermore, one of the sides of the trough 30 has a drain hole which is normally closed by a removable drain plug 38.

Secured to the upper ends of the side walls of the trough 30 and spanning the open top of the trough is a series of cable stub supporting non-metallic strips 40 in the form of an open mesh material. These strips 40 are of a non-metallic material and are of sufficiently open mesh to permit the flow of melted grease readily through. The strips 40 may be of a cloth or plastic material that does not tend to absorb much radiant heat when exposed thereto. The opposite ends of the strips 40 are secured to the outer surfaces of the trough side walls by rivets 50, or the like. Furthermore, the strips 40 are sufficiently flexible so as to yield slightly under the weight of the cable stub. Such an arrangement results in the cable stub being centered between the opposite sides of the trough 30. Furthermore, the arrangement tends to oppose the cable stub rolling off of the strips 40.

Provided for heating the cable stub 4 to remove the grease from around the insulated wires are radiant heating elements 52,52,52. These heating elements 52 are on the inside surfaces of the leg structures 18,20 and on the underside of the top section 22. The heating elements 52 preferably run the full length of the device, overhanging the end-most of the leg structures 10. The heating elements 52 include resistance wire 54 diagramatically shown in FIG. 3. The radiating surfaces 53 of the heating elements 52 may abut each other or be in close proximity as shown in FIG. 3. Also, those surfaces 53 extend over a major circumferential extend of the cable stub so that a large part of the circumference of the cable stub is directly presented to the surfaces 53. Furthermore, the radiant heating elements 52 may preferably emit energy in the 3-4 micron wave length, which energy is readily absorbed by the grease. The melting point of the grease is below that of the insulation of the wires 6.

Also forming parts of the heating elements 52 are junction boxes 55 having removable covers 56. The wiring in the junction boxes 55 serves to connect electrically the wiring 54 in the heating elements with a source of power. The boxes 55 may be attached to the back sides of the heating element 52 in any known manner. Furthermore, each heating element and its associated junction box is secured to the leg sections 18, 20 by bolt and nut assemblies 58.

The upper heating element 52 is attached to the top sections 22 by bolt and nut assemblies 60. Centrally of the top heating element 52 is a control box 62 which serves the function of a junction box, and in addition provides control for adjusting the heat output of the several heating elements 52. Extending from the control box 62 is a power line cord 64. Extending from the sides of the control box 62 are armored sheaths 66 that house the wiring that extends from the control box 62 to the junction boxes 55. This facilitates supplying power to the heating elements 52 while permitting protection of the wiring. On the top side of the control box is a dial 68 which may be calibrated in terms of temperature. The inside of the control box also contains a thermostatic regulator that may be connected to a suitable thermostatic sensing bulb (not shown) so as to control the temperature thermostatically of the heating elements 52, all in a conventional manner. Finally, the device 2 is made portable by a handle 70 that is secured to a bracket 72 which is, in turn, secured to a side of the control box 62.

In use, the unsheathed cable stub 2 is positioned on the open mesh strips 40, as shown in the drawing. When heat is applied to the cable stub from the radiant heaters 52 the grease from around the cable stub melts and drains downwardly and is collected in a pool 74 (FIG. 3) in the trough 30. The open mesh plastic strips 40 permit the grease to flow readily therethrough while at the same time they provide an adequate support for the cable stub. Furthermore the material for the strips 40 do not absorb much heat and so they do not create "hot spots" on the cable stub which might damage the insulation of the wires. The temperature dial 68 is preferably adjusted such that the heat will melt the grease readily but will nevertheless not result in damage of the insulation of the cable stub wires.

After the grease has melted off and collected in the trough 74, the cable stub is removed and the small amount of grease remaining as a film on the wires may, if necessary, be finished cleaned by a small amount of solvent.

The invention is claimed as follows:

1. A method of cleaning grease from around the insulated wires of an electrical cable stub wherein the cable has a sheath that has been removed at the stub to expose the grease packed insulated wires, said method comprising positioning said stub over an open top trough so that the grease is exposed to the inside of the trough, heating the stub to a temperature sufficient to melt the grease and allow it to run off of the stub into the trough to be collected therein, maintaining the temperature to which the stub is exposed at a level that avoids damage to the insulation of the wires, and during said heating supporting said stub on a structure of sufficiently low heat absorbtivity so as to prevent the formation of hot spots on the cable which might damage the insulation of the wires.

2. A method according to claim 1 further including supporting said stub on said structure at spaced apart regions.

3. A method according to claim 1 or claim 2 in which the heating is carried out over the length and a major portion of the circumference of the stub.

4. A method of cleaning grease from around the insulated wires of an electrical cable stub wherein the cable has a sheath that has been removed at the stub to expose the grease packed insulated wires, said method comprising positioning said stub over an open top trough so that the grease is exposed to the inside of the trough through said open top, heating the stub by exposure to radiant heat over a major portion of its circumference and length to a temperature sufficient to melt the grease and allow it to run off of the stub and into the trough to be collected therein, maintaining the temperature to which the stub is exposed at a level that avoids damage to the insulation of the wires, and supporting said cable stub on a series of spaced apart pieces of flexible open mesh of material during the positioning of said cable stub over said trough, said open mesh material having sufficiently low heat absorption characteristics to prevent the formation of hot spots on the cable which might damage the insulation of the wires.

* * * * *